(12) United States Patent
Danko

(10) Patent No.: US 9,251,435 B2
(45) Date of Patent: Feb. 2, 2016

(54) SCREENSHOT DATABASE FOR APPLICATION VERIFICATION

(71) Applicant: ORACLE INTERNATIONAL CORPORATION, Redwood Shores, CA (US)

(72) Inventor: Krisztian Danko, Waterloo (CA)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/293,936

(22) Filed: Jun. 2, 2014

(65) Prior Publication Data

US 2015/0086115 A1    Mar. 26, 2015

Related U.S. Application Data (60) Provisional application No. 61/880,640, filed on Sep. 20, 2013.

(51) Int. Cl.
*G06K 9/62* (2006.01)
*G06F 9/44* (2006.01)
*G06F 11/36* (2006.01)

(52) U.S. Cl.
CPC ............... *G06K 9/6217* (2013.01); *G06F 8/00* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 5,893,095 A * | 4/1999 | Jain et al. | |
| 5,978,494 A * | 11/1999 | Zhang | 382/117 |
| 6,215,898 B1 * | 4/2001 | Woodfill et al. | 382/154 |
| 6,888,968 B1 * | 5/2005 | Takano et al. | 382/245 |
| 2007/0050411 A1 * | 3/2007 | Hull et al. | 707/104.1 |
| 2009/0237526 A1 * | 9/2009 | Dozier et al. | 348/231.2 |
| 2011/0231823 A1 * | 9/2011 | Fryc et al. | 717/125 |

* cited by examiner

*Primary Examiner* — Sumati Lefkowitz
*Assistant Examiner* — Jiangeng Sun
(74) *Attorney, Agent, or Firm* — Kilpatrick Townsend & Stockton LLP (57) ABSTRACT

A method may include receiving an image where the image may depict a screenshot of results of an application test. The method may also include comparing the image to a plurality of reference images and selecting a reference image that is the most similar to the image. The method may additionally include generating a delta image representing a difference between the reference image and the image. The method may further include storing the delta image with a reference to the reference image.

20 Claims, 8 Drawing Sheets

```
function add_image(image){
    if (reference_images.record_count == 0) then          ─── 402
        save_image_to_reference_area(image)
        return smallest_delta_image = null                            ─┐
    smallest_delta_reference_image = null                   │
    smallest_delta_image_size = MAX_SIZE                    │
    for each reference_image in reference_images:           │
        delta_image = get_image_difference(reference_image, image)
        delta_image_file = save_compressed_image(delta_image)  ── 404
        size = delta_image_file.size()                      │
        if size < smallest_delta_image_size then:           │
            smallest_delta_image = delta_image              │
            smallest_delta_reference_image = reference_image│
            smallest_delta_image_size = size                │
        else                                                │
            delete delta image file                        ─┘ if (smallest_delta_image_size / image.size()) < MINIMUM_COMPRESSION_RATIO then
        // Save pointer to reference image and delta image        ─── 406
        save_image_to_delta_area(smallest_delta_reference_image, smallest_delta_image)
    else
        // Compression ratio is not as high as expected           ─── 408
        save_image_to_reference_area(image)

return
}
```

SCREENSHOT DATABASE FOR APPLICATION VERIFICATION

CROSS-REFERENCES TO RELATED APPLICATIONS

This application claims the benefit of U.S. Provisional Application No. 61/880,640, filed Sep. 20, 2013, entitled "SCREENSHOT DATABASE FOR APPLICATION VERIFICATION," which is incorporated herein by reference.

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Many entities—both inside and outside of the Enterprise Software space—may deploy numerous applications that are made available to client systems through web interfaces or client-server relationships. In some cases, these applications may need to be perpetually available to clients, which may allow for very little down time. At the same time however, entities may need to provide periodic updates, upgrades, and patches to deployed applications. This may require various testing procedures to be run against the applications in order to verify that the upgrades, updates, and patches did not interfere with the normal operation of the applications. Therefore, improvements are needed in the art.

BRIEF SUMMARY

In one embodiment, a method of processing and storing screenshot images may be presented. The method may include receiving an image where the image may depict a screenshot of results of an application test. The method may also include comparing the image to a plurality of reference images and selecting a reference image that is the most similar to the image. The method may additionally include generating a delta image representing a difference between the reference image and the image. The method may further include storing the delta image with a reference to the reference image.

In another embodiment, a non-transitory computer-readable medium may be presented. The computer-readable memory may comprise a sequence of instructions which, when executed by one or more processors, causes the one or more processors to perform operations including receiving an image. The image may depict a screenshot of results of an application test. The operations may also include comparing the image to a plurality of reference images and selecting a reference image that is the most similar to the image. The operations may additionally include generating a delta image representing a difference between the reference image and the image. The operations may further include storing the delta image with a reference to the reference image.

In yet another embodiment, a system may be presented. The system may include one or more processors and a memory communicatively coupled with and readable by the one or more processors. The memory may comprise a sequence of instructions which, when executed by the one or more processors, cause the one or more processors to perform operations including receiving an image. The image may depict a screenshot of results of an application test. The operations may also include comparing the image to a plurality of reference images and selecting a reference image that is the most similar to the image. The operations may additionally include generating a delta image representing a difference between the reference image and the image. The operations may further include storing the delta image with a reference to the reference image.

In various implementations, the method/operations may also include receiving a second image, comparing the second image to the plurality of reference images, determining that none of the plurality of reference images are similar enough to the second image according to a similarity threshold, and storing the second image in a reference area of the database system, wherein the reference area is separate from a delta area where the delta image is stored. The method/operations may also include dynamically adjusting the similarity threshold to maintain a predetermined ratio of average delta image size to average reference image size. The method/operations may also include dynamically adjusting the similarity threshold to maintain a predetermined ratio of reference images to delta images. The method/operations may also include balancing a number of reference images stored in a reference area of the database system with a number of delta images stored in a delta area of the database system to maintain a predetermined ratio of reference images to delta images. The method/operations may also include balancing a number of reference images stored in a reference area of the database system with a number of delta images stored in a delta area of the database system to maintain a predetermined ratio of average delta image size to average reference image size. The method/operations may also include determining whether the delta image is sufficiently smaller than the reference image before storing the delta image in a delta area of the database system. The delta image may be compressed before it is stored in the delta area of the database system. The method/operations may also include calculating a Hamming distance between the reference image and the new image based on the delta image. The delta image may be significantly smaller than the reference image by removing portions of the delta image that are the same as corresponding portions of the reference image.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments for storing massive amounts of visual information that are required for a screenshot-based method of testing application functionality. A read-only application test suite performs automated tests on an application by comparing test screenshots to expected screenshots. For example, one application test suite may automatically test web browser-based applications against posted browser-based applications. For large enterprise applications, several hundred or even thousands of instances of these applications spanning many physical servers may be present at any time. Read-only application testing involves simulating key presses, mouse clicks, or filling out forms as would be expected for user inputs. A test is deemed successful if a series of simulated user actions result in an expected output on the screen. For example, entering a search criteria into a text box, and clicking the search button is expected to return a certain list of search results. If the expected search does not appear in the browser as expected, then the test will fail to one degree or another.

In the example of a search engine, comparing the results would normally involve difficult parsing through text-based HTML code provided to the browser from the search engine. Rather than comparing actual data results, it may be more efficient to compare a screenshot of the expected results with a screenshot of the actual results. In some embodiments, tests may use a real web browser, such as Mozilla Firefox®, Microsoft Internet Explorer®, Google Chrome®, and/or the like, for testing using a virtual screen. As used herein, a "virtual screen" may include a virtual frame-buffer in X-Windows. Screenshots of the virtual screen may be recorded after automatic inputs are provided to the application during a test scenario. Whether or not a test fails, it may be desirable to record a screenshot of the results for future analysis. For example, the screenshots may be saved in any graphical format such as the Portable Network Graphics (PNG) format.

In order for this method of testing web-based applications to be effective, it is important that screenshots are quickly retrievable for a given test result. While screenshot-based results can be easily compared and analyzed compared to text or code-based results, screenshots require far more disk space to store. Each screenshot typically requires a full image of the screen, along with any metadata concerning the test, such as a test name, an outcome (pass/fail), a testing time, an application name, a test scenario, a number of inputs, and/or the like. In a typical web-based Enterprise Application Suite, hundreds of applications may need to be tested. Furthermore, each application may require hundreds of different input combinations, each resulting in individual screenshot results. Storing hundreds of thousands of screenshots in a test database is difficult to maintain, requires extensive backup hardware, and is slow to respond to queries.

The embodiments described herein describe a way to significantly reduce the amount of disk space required to store a large number of screenshots associated with these automated test scenarios. The inventors made two key discoveries that allow for significant space-saving advantages. These embodiments leverage two principles. First, most newly added screenshots in a single test scenario are very similar to previous screenshots, and may include only minor differences. Second, most screenshots can be assigned to an existing group of screenshots such that all of the screenshots in the group are very similar. Even if the number of screenshots groupings grows linearly, the similarities between screenshots allow the embodiments described herein to provide significant disk space savings.

In the simplest case, a group of screenshots may all have the same dimensions. However, the methods described herein can easily deal with images having different dimensions. This allows an application test suite to simply record screenshots that focus on relevant areas of the browser-based interface. For example, a screenshot of only a results box, a text box, a list of images, and/or the like, maybe to be recorded instead of the entire visual interface. In some embodiments, an entire screenshot may be recorded, but only a relevant portion (e.g., a textbox) may be stored.

In some embodiments, an image database may be created comprising two main storage areas. The first area may be referred to herein as a "reference area" and may be configured to store complete images. These images may include an entire screenshot of a display device, a screenshot of a graphical user interface, and/or a screenshot of a single components or a group of components in an interface. In some embodiments, these complete images may be stored as JPEG's, PNG's, bitmaps, and/or any other known graphical file type.

A second area of the image database may be referred to herein as a "delta area" and may be configured to store information that describes a difference between a complete image stored in the reference area and a new image. In some embodiments, the delta area may include a field for a pointer to an image in the reference area. In some embodiments, the delta area may also include a difference between the reference image and the new image. As referred to herein, images in the reference area may be referred to as reference images, and images in the delta area may be referred to as delta images. Generally, it is typical that the disk space consumed by delta images is significantly less than the space consumed by reference images. Additionally, it is typical that as the database grows larger, the number of reference images remains very small compared to the number of delta images. In one embodiment using sample data, a reference image and a corresponding compressed delta image were compared. Instead of requiring 80,837 bytes to store the entire screenshot, only 4939 bytes was required to store the compressed delta image. The delta image required only about 6% of the size of the original image.

Figure 1:
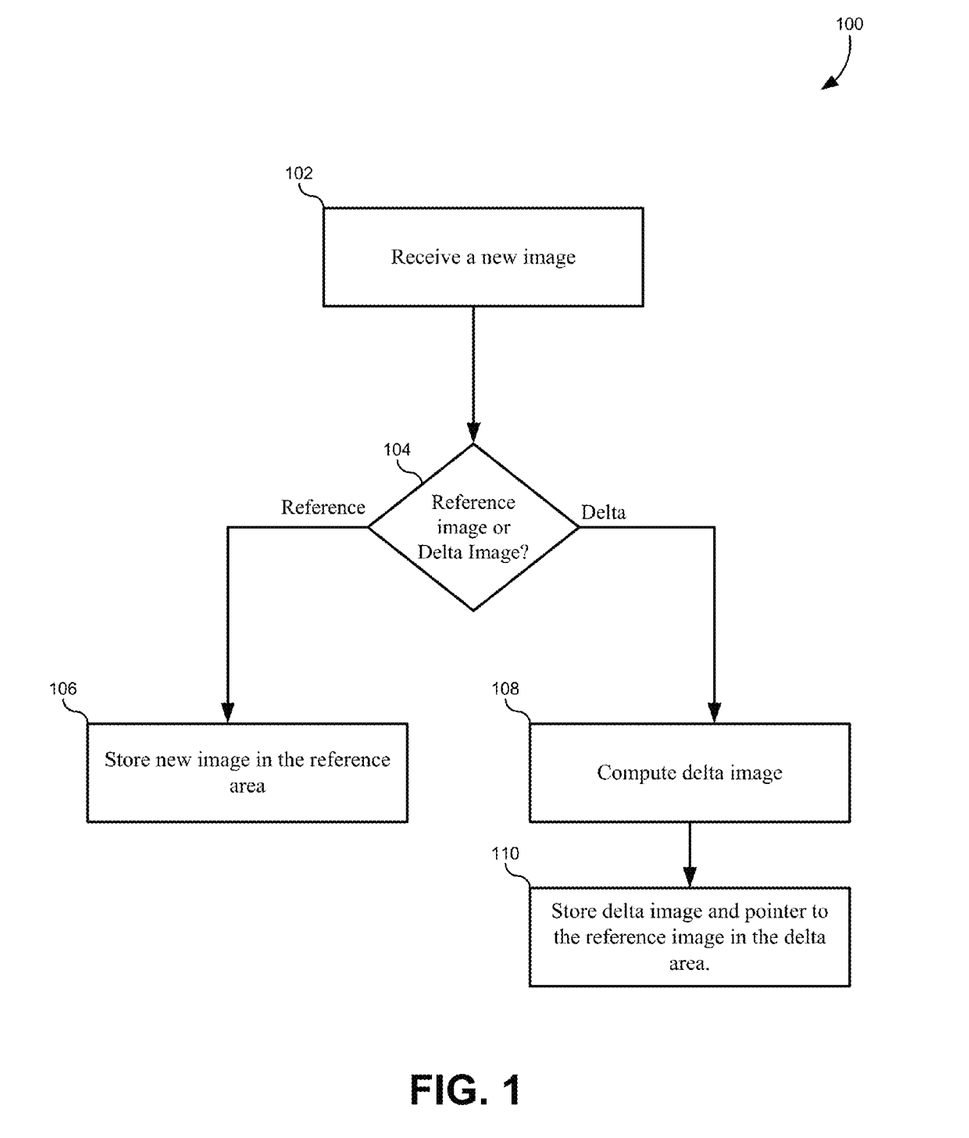
FIG. 1 illustrates a flowchart of a method for storing screenshots in a screenshot database, according to some embodiments.
Figure 2:
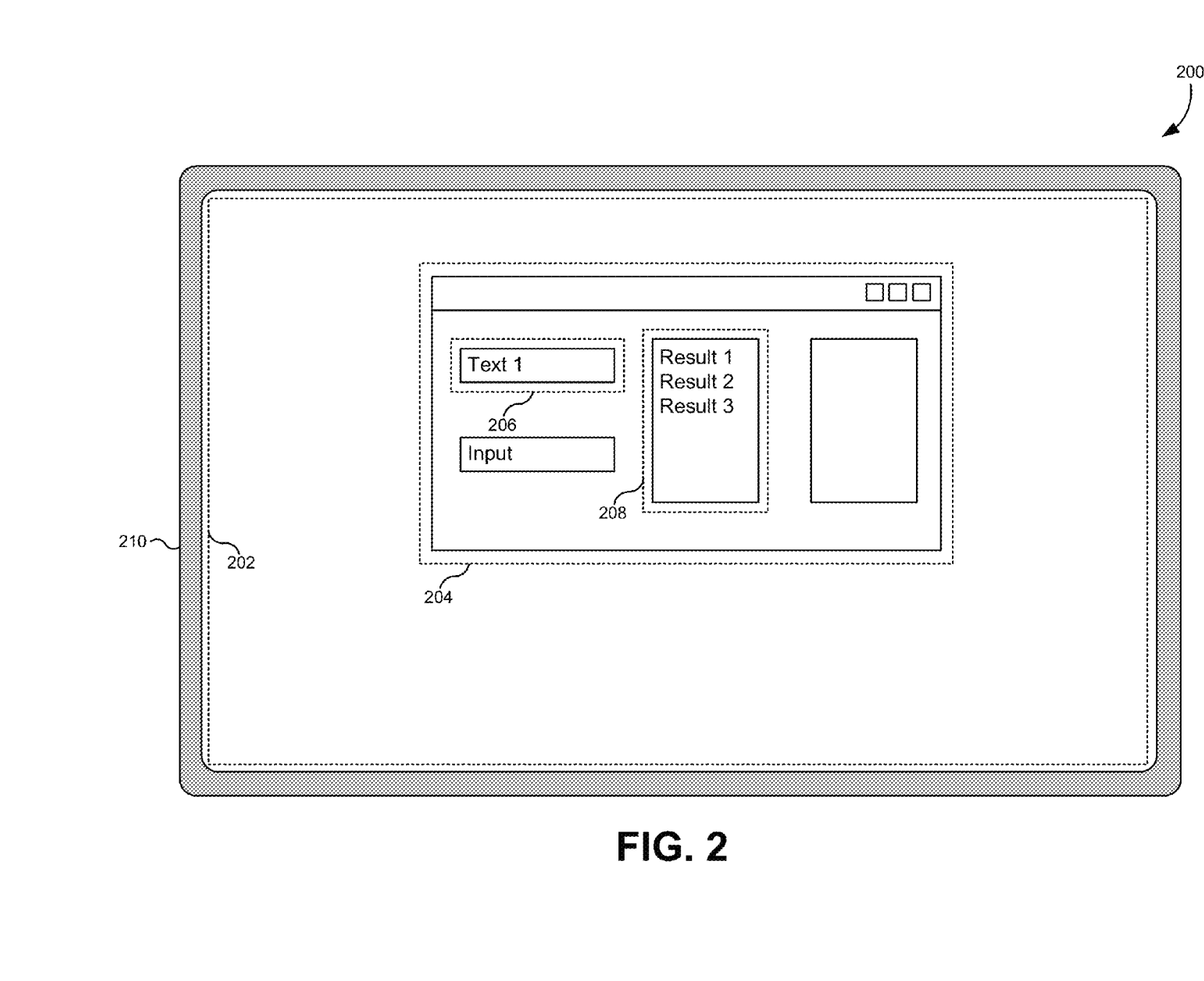
FIG. 2 illustrates a screenshot with various text areas highlighted that may be extracted from the application interface and stored as a reference image, according to some embodiments.

FIG. 1 illustrates a flowchart 100 of a method for storing screenshots in a screenshot database, according to some embodiments. The method may include receiving a new image (102). The new image may include a screenshot of a display device, a screenshot of a single application, and/or screenshots of one or more components, viewing areas, controls, text areas, etc. of the application. In some embodiments, the one or more components need not be contiguous. For example, FIG. 2 illustrates a screenshot with various text areas highlighted that may be extracted from the application interface and stored as a reference image. The screenshot may be received from a read-only application test suite. The screenshot image may also be received as part of a series of images from a single test session of an application. Area 202 illustrates a screenshot of a display device 210, while area 204 illustrates a screenshot of an application. Similarly, areas 206 and 208 illustrate screenshots of single components. In some embodiments, area 206 and area 208 may be involved in the testing procedure (e.g. these areas may provide outputs based on user inputs). In these embodiments, the combination of area 206 and area 208 may be combined to form the new image.

Turning back to FIG. 1, whenever a new image is received by the database to be added as a historical reference, two decisions need to be made. First, should the image be stored in the reference area or in the delta area? Second, if the image is stored in the delta area, then which image will be chosen as its reference image? Therefore, the method may further include determining whether the image should be stored as a reference image or a delta image (104). If it is determined that the new image to be stored in the reference area, then the method may further include storing the new image in the reference area (106).

However, if it is determined that a similar image is already stored in the reference area, then it may be better to store the new image as a delta image based on the a pre-existing reference image. The method may then further include computing a delta image for the new image (108). The delta image may be based on a selected reference image that is similar to the new image. The delta image may include information that describes the difference between the reference image and the new image. After the delta image is computed, the method may include storing the delta image (110). In some embodiments, the delta image may be stored with some form of association with the reference image. For example, the delta image may be stored with a pointer to the reference image. In some embodiments, the delta images may be stored in one portion of a database referred to as a delta area, and the reference images may be stored in a second portion of the database—or a separate database—referred to as a reference area. The delta area may include fields that link delta images to table entries for reference images in the reference area.

Figure 3:
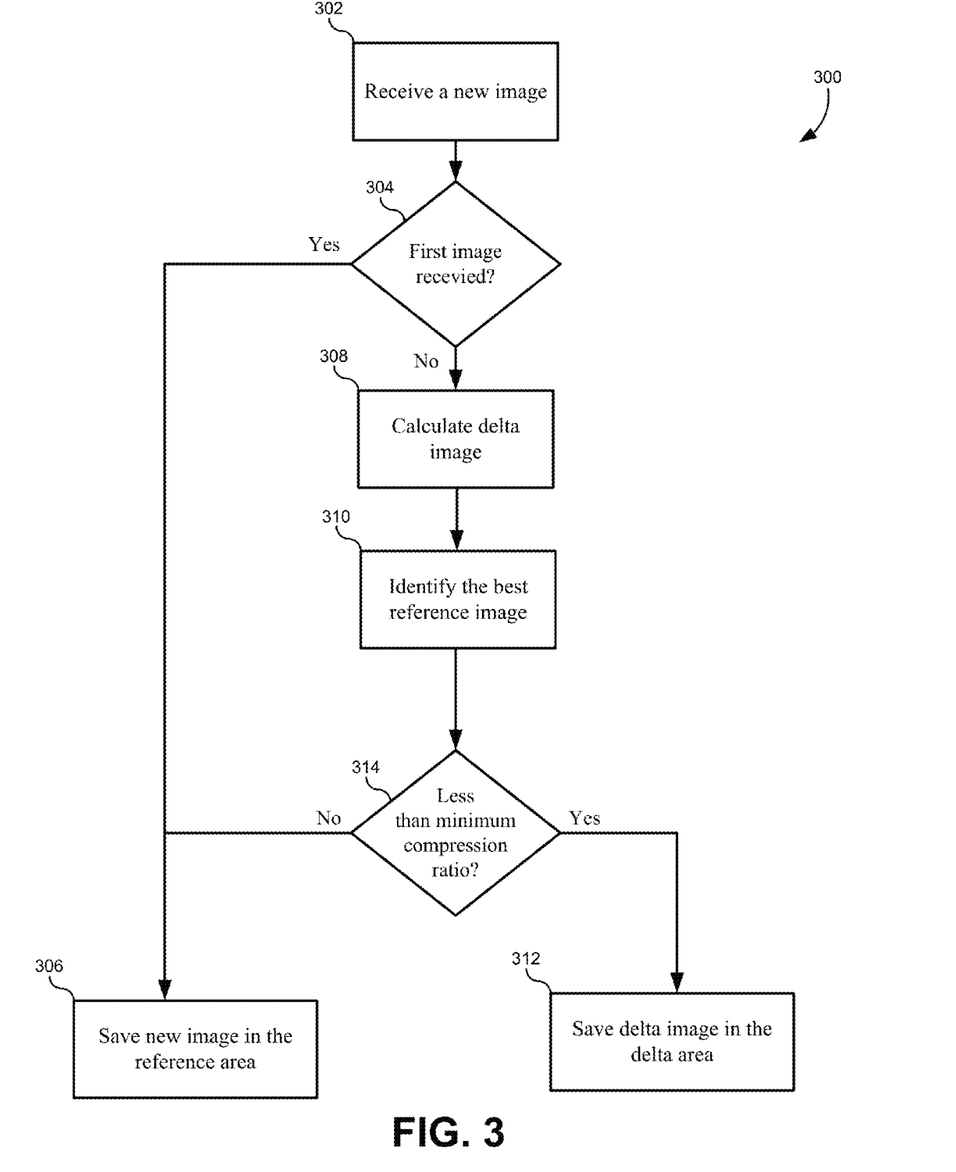
FIG. 3 illustrates a flowchart of a method for determining where a new image should be stored, according to some embodiments.

FIG. 3 illustrates a flowchart 300 of a method for determining where a new image should be stored, according to some embodiments. The method may include receiving a new image (302). As described above, the new image may be received from an application test suite. The method may first determine whether the new image is the first image received (304). For example, if the resource area of the image database system is empty, then there would be no available reference images upon which a new delta image could be based. In this case, the new image may be stored in the reference area (306). Subsequently images then can be compared to the new image in the reference area to generate delta images.

If the new image is not the first image received, then the method may include calculating a delta image (308). In one embodiment, the delta image may be derived by performing a bitwise XOR operation between the new image and a reference image. In cases where multiple reference images are available, a delta image corresponding to each available reference image may be calculated, and the delta image with the smallest size may be retained. In other words, part of calculating the delta image may include determining which available reference image is the most similar to the new image (310). Pseudocode will be provided below to describe these operations in more detail, according to some embodiments.

After the best reference image is identified and the delta image is calculated, a decision may be made as to whether the delta image is small enough to be stored as a delta image, or whether the delta image should be discarded and image should simply be saved as a reference image. For example, the reference area may include a number of different reference images, none of which are very similar to the new image. This method will still identify the most similar reference image, however, the delta image might be very large. In this case, it makes more sense to recognize that the new image is a different image, and should be stored in the reference area instead of the delta area. Therefore, the new image can be saved in the reference area (306).

If the delta image is less than the minimum compression threshold, then the delta image and possibly some reference to the corresponding reference image can be stored in the delta area (312). In some embodiments, the delta image may be compressed before it is stored in the delta area. The compression ratio in this method may be defined as the ratio between the size of the delta image and the size of the new image. For example, if the new image is 100 kB in size, and the closest reference image generates a delta image that is only 50 kB in size, then the compression ratio would be 0.5. The minimum compression ratio can be a tunable variable or constant between 0 and 1 that determines the minimum compression ratio desired for delta area storage. A smaller minimum compression ratio will result in more images ending up in the reference area. In contrast, a larger minimum compression ratio will result in more images in the delta area, but delta area images may be larger.

In some embodiments, the minimum compression ratio can be adjusted dynamically to maintain a size ratio between the reference area and the compression area. For example, an ideal ratio may be calculated that maximizes the storage space saved, e.g. a 10 to 1 ratio between delta images and reference images can be used. The number of reference images may be compared to the number of delta images as new images are added, and the minimum compression ratio may be adjusted to maintain a delta-to-reference ratio that is near the ideal. Other embodiments may adjust the minimum compression ratio according to other metrics. For example, the minimum compression ratio may be adjusted to maintain an ideal total storage in the combined reference area and delta area.

Some embodiments may store each reference image in the same reference area. Other embodiments may partition the reference area according to different applications under test. Instead of needing to compare a new image to every available reference image, the method may instead limit its comparisons to reference images in the partition of the reference area that corresponds to the current application under test. For example, a data entry application could store reference images in a first partition of the reference area, while a data search application could store reference images in a second partition of the reference area. The same partitioning may also take place in the delta area; however, this may not be necessary because each delta image may be stored with a reference to its corresponding reference image.

Some implementations may also add additional features that both reduce the number of reference images that require comparison, as well as decrease the operational complexity of calculating the delta image and compressing the delta image for storage in the delta area. For example, rather than attempting to compress the delta image for each comparison, the method may instead calculate the Hamming distance between the two images based on the delta image, then choose the reference image with the smallest Hamming distance to the new image. Furthermore, rather than calculating the Hamming distance on the complete image, the Hamming distance could be calculated based on a scaled-down version of the images. By scaling down enough, the method may be able to perform the entire comparison loop in memory. For example, using 64×64 grayscale samples, up to 256 reference images could be stored in one megabyte of memory. By not having to perform disk read and write operations, loading and comparing the reference images can be accomplished much faster than normal.

Some implementations may also periodically rebalance the reference images and the delta images. Some embodiments may store a default image as the first image in the reference area. The default image may comprise a screenshot of the application without any output response. For example, it may include a browser window without a search response. This typically ensures that the delta images based on the default image will be as small as possible. However, in some cases the best reference images may end up as delta images simply by virtue of the order in which they are processed. Therefore, some embodiments may periodically determine an optimal set of reference images from the reference images and the delta images, regenerate reference images as necessary, and regenerate the delta images based on the new set of reference images. The new set of reference images and delta images may then be stored in the reference area and delta area, respectively.

It should be appreciated that the specific steps illustrated in FIGS. 1 and 3 provide particular methods of processing and storing screenshot images according to various embodiments of the present invention. Other sequences of steps may also be performed according to alternative embodiments. For example, alternative embodiments of the present invention may perform the steps outlined above in a different order. Moreover, the individual steps illustrated in FIGS. 1 and 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
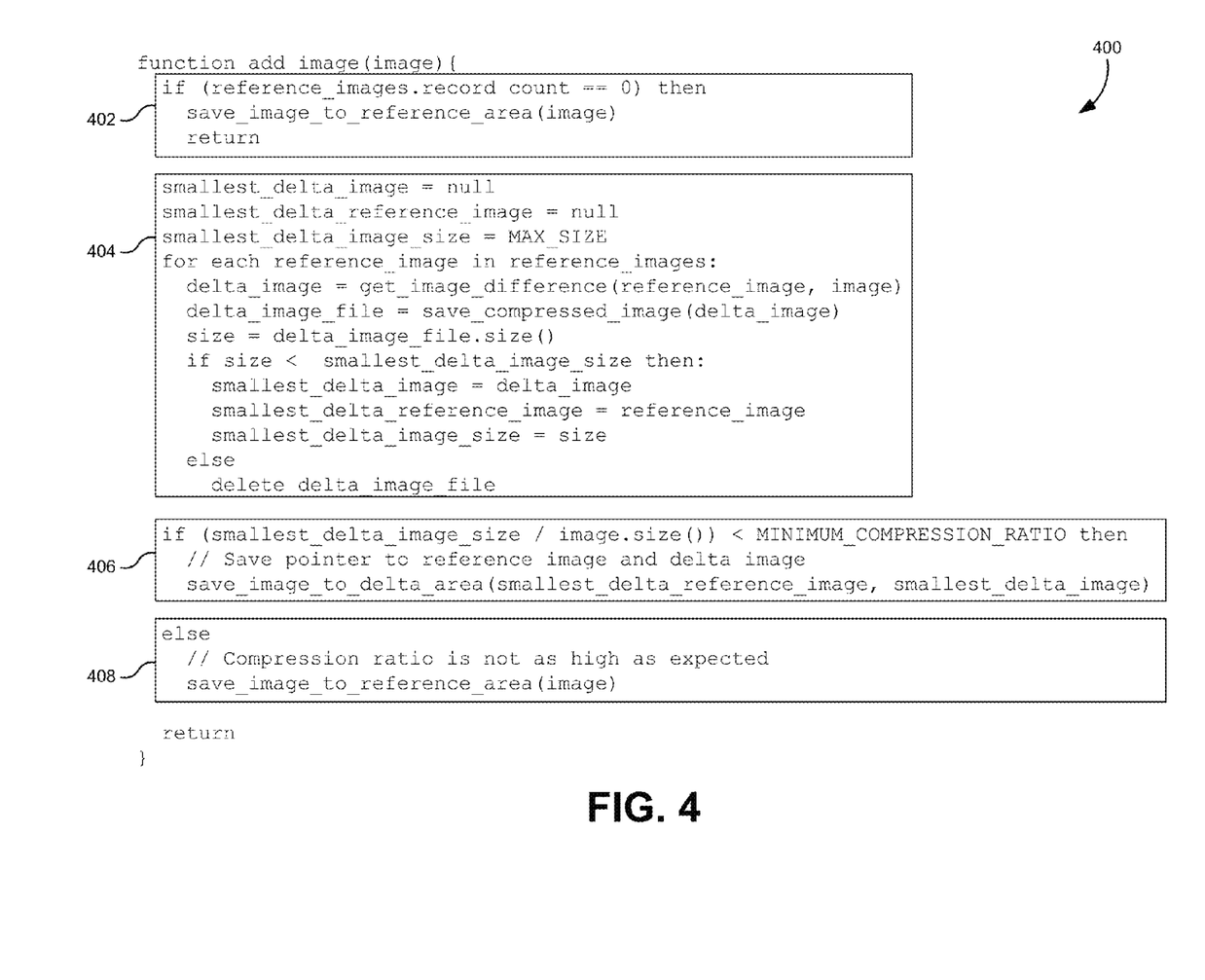
FIG. 4 illustrates pseudocode for implementing a method for storing screenshot images, according to some embodiments.

FIG. 4 illustrates pseudocode 400 for implementing a method for storing screenshot images, according to some embodiments. Section 402 of the pseudocode 400 deals with the initial case where the reference area is empty, i.e. the received image is the first image to be stored in the reference area. Section 404 of the pseudocode 400 loops through each of the available reference images, generates a corresponding delta image, and results in a delta image corresponding to the closest reference image. Section 406 of the pseudocode 400 determines whether the identified delta image meets the minimum compression ratio threshold, and stores the delta image to the delta area. Finally, section 408 of the pseudocode 400 acts as a default and saves the image to the reference area. Note that this pseudocode illustrates only one possible implementation. Other implementations would also be clear to one having skill in the art in light of this disclosure.

Figure 5:
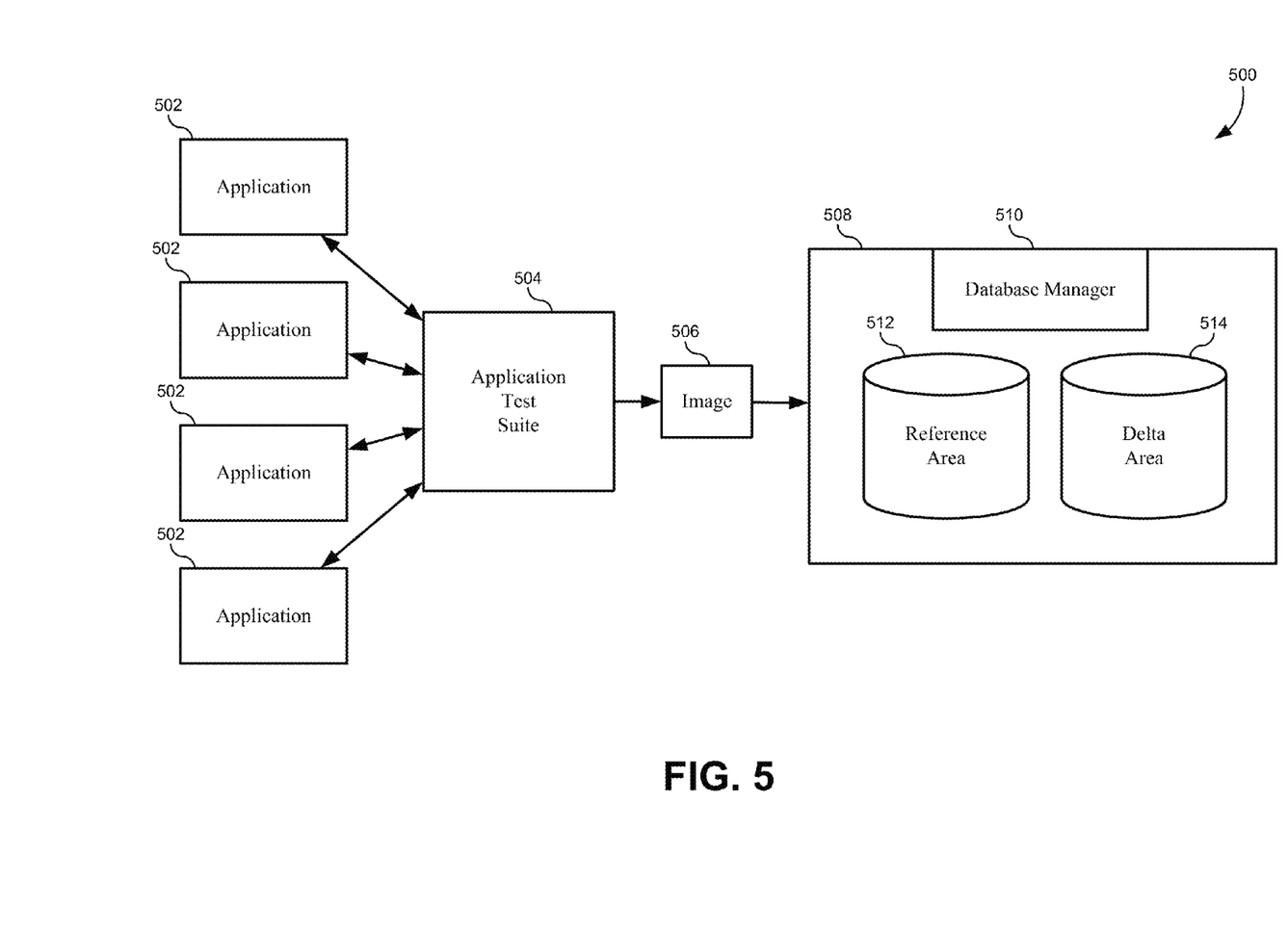
FIG. 5 illustrates a block diagram of an application test suite environment, according to some embodiments.

FIG. 5 illustrates a block diagram 500 of an application test suite environment, according to some embodiments. As described above, the methods and systems described herein may be implemented using a general purpose computer system and/or a network computer environment, such as those described in greater detail below. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 500 represents an abstraction of the functions that may be implemented using these types of hardware. After reading this disclosure, one having skill in the art could use these well-known circuit elements to construct the device shown in FIG. 5 to implement these methods and systems.

Various applications 502 may each interact with an application test suite 504. The application test suite 504 may provide automated inputs to each of the applications 502 and may capture screenshots of the applications 502 in response to their processing the automated inputs. The application test suite 504 may provide screenshot images 506 to a screenshot storage database 508. The screenshot storage database may include a database manager 510 configured to receive the screenshot images 506 and perform the methods described herein to either (i) store the screenshot image 506 in a reference area 512, or (ii) store a delta version of the screenshot image 506 in a delta area 514.

In one embodiment, the various modules and systems in FIG. 5 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 6:
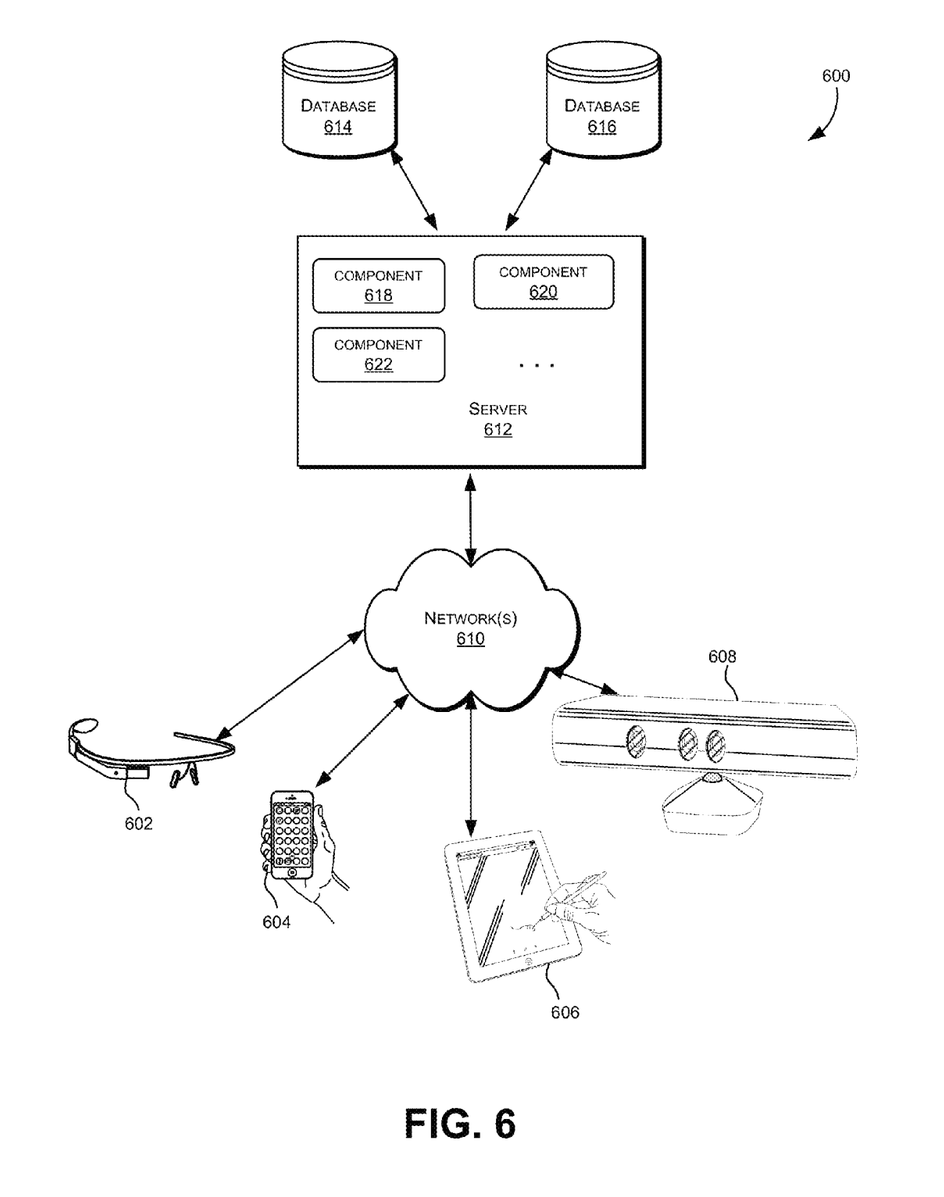
FIG. 6 illustrates a simplified block diagram of a distributed system for implementing some of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
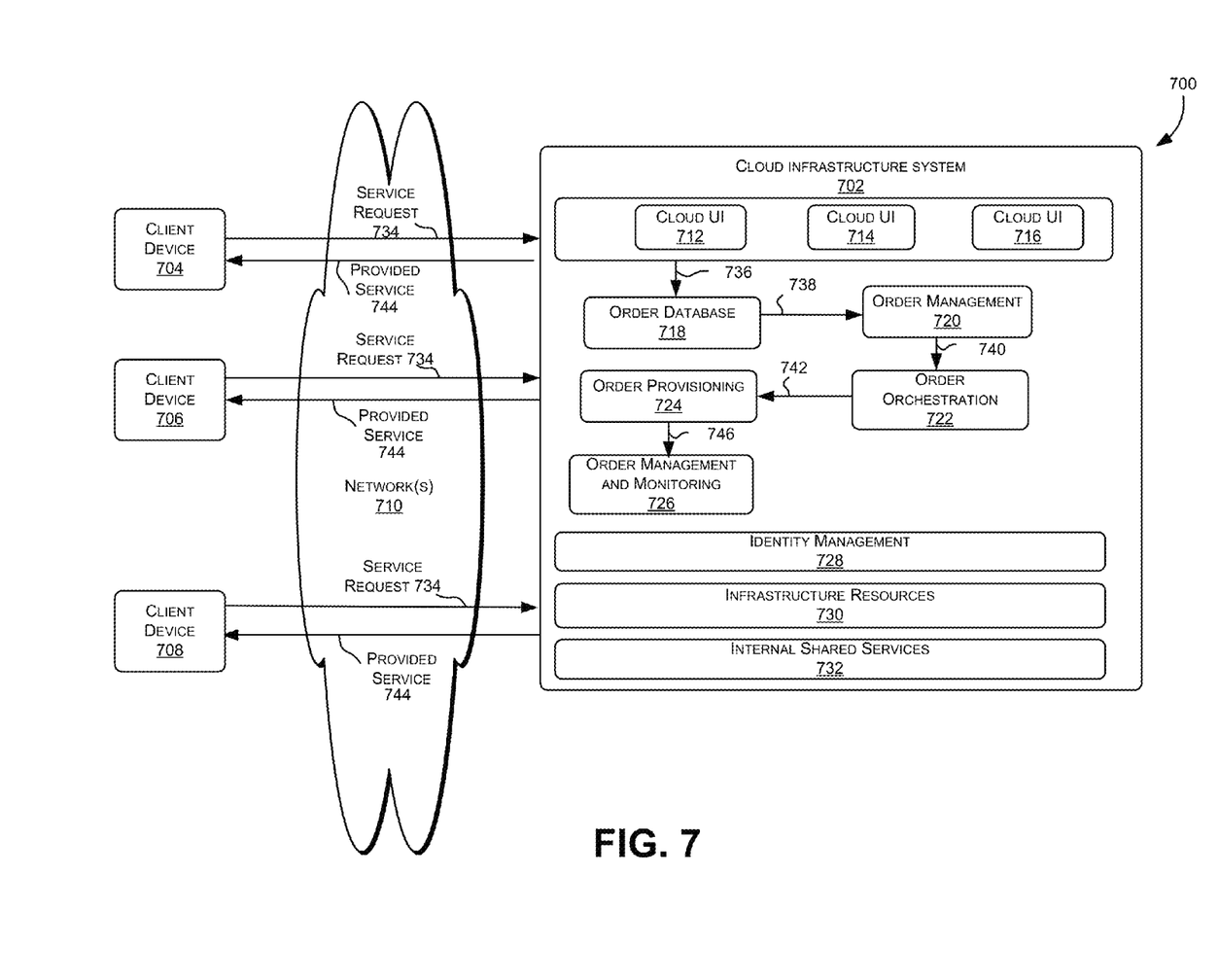
FIG. 7 illustrates a simplified block diagram of components of a system environment by which services provided by the components of an embodiment system may be offered as cloud services.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
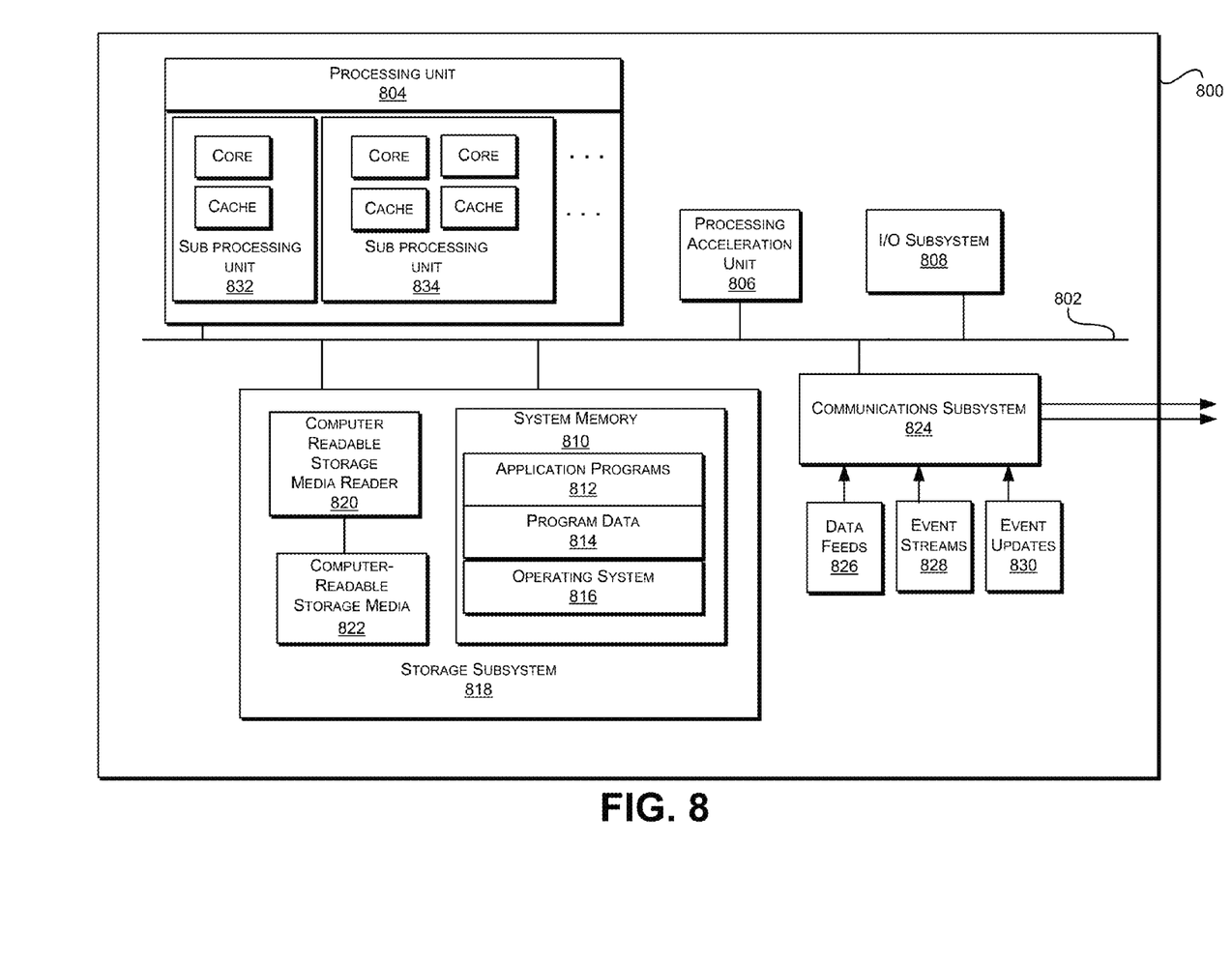
FIG. 8 illustrates an exemplary computer system, in which various embodiments may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of processing and storing screenshot images, the method comprising:
   receiving, using a computer system, an image, the image depicting a screenshot of results of an application test;
   comparing, using the computer system, the image to a plurality of reference images;
   selecting, using the computer system, a reference image that is the most similar to the image;
   generating, using the computer system, a delta image representing a difference between the reference image and the image;
   storing, using the computer system, the delta image with a reference to the reference image; and
   balancing, using the computer system, a number of reference images stored in a reference area with a number of delta images stored in a delta area to maintain one or more of:
   a predetermined ratio of reference images to delta images; or
   a predetermined ratio of average delta image size to average reference image size.

2. The method of claim 1 further comprising:
   receiving a second image;
   comparing the second image to the plurality of reference images;
   determining that none of the plurality of reference images are similar enough to the second image according to a similarity threshold; and
   storing the second image in the reference area, wherein the reference area is separate from the delta area where the delta image is stored.

3. The method of claim 2 further comprising dynamically adjusting the similarity threshold to maintain the predetermined ratio of average delta image size to average reference image size.

4. The method of claim 2 further comprising dynamically adjusting the similarity threshold to maintain the predetermined ratio of reference images to delta images.

5. The method of claim 1 further comprising determining whether the delta image is a predetermined threshold amount smaller than the reference image before storing the delta image in a delta area of the database system.

6. The method of claim 1 wherein the delta image is compressed before it is stored in the delta area of the database system.

7. The method of claim 1 further comprising calculating a Hamming distance between the reference image and the new image based on the delta image.

8. The method of claim 1 wherein the delta image is made smaller than the reference image by removing portions of the delta image that are the same as corresponding portions of the reference image.

9. A non-transitory, computer-readable medium comprising a sequence of instructions which, when executed by one or more processors, causes the one or more processors to perform operations comprising:
- receiving an image, the image depicting a screenshot of results of an application test;
- comparing the image to a plurality of reference images;
- selecting a reference image that is the most similar to the image;
- generating a delta image representing a difference between the reference image and the image;
- storing the delta image with a reference to the reference image; and
- balancing a number of reference images stored in a reference area of the database system with a number of delta images stored in a delta area of the database system to maintain one or more of:
  - a predetermined ratio of reference images to delta images; or
  - a predetermined ratio of average delta image size to average reference image size.

10. The non-transitory computer-readable medium according to claim 9 wherein the instructions further cause the one or more processors to perform additional operations comprising:
- receiving a second image;
- comparing the second image to the plurality of reference images;
- determining that none of the plurality of reference images are similar enough to the second image according to a similarity threshold; and
- storing the second image in the reference area, wherein the reference area is separate from the delta area where the delta image is stored.

11. The non-transitory computer-readable medium according to claim 10 wherein the instructions further cause the one or more processors to perform additional operations comprising dynamically adjusting the similarity threshold to maintain the predetermined ratio of average delta image size to average reference image size.

12. The non-transitory computer-readable medium according to claim 10 wherein the instructions further cause the one or more processors to perform additional operations comprising dynamically adjusting the similarity threshold to maintain the predetermined ratio of reference images to delta images.

13. The non-transitory computer-readable medium according to claim 9 wherein the instructions further cause the one or more processors to perform additional operations comprising determining whether the delta image is a predetermined threshold amount smaller than the reference image before storing the delta image in a delta area of the database system.

14. The non-transitory computer-readable medium according to claim 9 wherein the instructions further cause the one or more processors to perform additional operations comprising calculating a Hamming distance between the reference image and the new image based on the delta image.

15. A system comprising:
- one or more processors; and
- a memory communicatively coupled with and readable by the one or more processors and comprising a sequence of instructions which, when executed by the one or more processors, cause the one or more processors to perform operations comprising:
  - receiving an image, the image depicting a screenshot of results of an application test;
  - comparing the image to a plurality of reference images;
  - selecting a reference image that is the most similar to the image;
  - generating a delta image representing a difference between the reference image and the image;
  - storing the delta image with a reference to the reference image; and
  - balancing a number of reference images stored in a reference area of the database system with a number of delta images stored in a delta area of the database system to maintain one or more of:
    - a predetermined ratio of reference images to delta images; or
    - a predetermined ratio of average delta image size to average reference image size.

16. The system of claim 15 wherein the instructions further cause the one or more processors to perform additional operations comprising determining whether the delta image is a predetermined threshold amount smaller than the reference image before storing the delta image in a delta area of the database system.

17. The system of claim 15 wherein the delta image is compressed before it is stored in the delta area of the database system.

18. The system of claim 15 wherein the delta image is made smaller than the reference image by removing portions of the delta image that are the same as corresponding portions of the reference image.

19. The system of claim 15 wherein the instructions further cause the one or more processors to perform additional operations comprising dynamically adjusting a similarity threshold to maintain the predetermined ratio of average delta image size to average reference image size.

20. The system of claim 15 wherein the instructions further cause the one or more processors to perform additional operations comprising dynamically adjusting a similarity threshold to maintain the predetermined ratio of reference images to delta images.

\* \* \* \* \*